United States Patent
Schöne et al.

(10) Patent No.: US 10,661,726 B2
(45) Date of Patent: May 26, 2020

(54) ILLUMINABLE EMBLEM

(71) Applicant: HELLA GmbH & Co. KGaA, Lippstadt (DE)

(72) Inventors: Heiko Schöne, Zell im Wiesental (DE); Ana Bizal, Feiburg im Breisgau (DE)

(73) Assignee: HELLA GMBH & CO. KGAA, Lippstadt (DE)

(*) Notice: Subject to any disclaimer, the term of this patent is extended or adjusted under 35 U.S.C. 154(b) by 0 days.

(21) Appl. No.: 16/144,206

(22) Filed: Sep. 27, 2018

(65) Prior Publication Data
US 2019/0100159 A1    Apr. 4, 2019

(30) Foreign Application Priority Data
Sep. 29, 2017  (DE) .......... 10 2017 217 508

(51) Int. Cl.
| B60Q 1/00 | (2006.01) |
| B60R 13/00 | (2006.01) |
| F21S 43/237 | (2018.01) |
| F21S 43/241 | (2018.01) |
| F21S 43/245 | (2018.01) |
(Continued)

(52) U.S. Cl.
CPC .......... B60R 13/005 (2013.01); F21S 43/237 (2018.01); F21S 43/241 (2018.01); F21S 43/245 (2018.01); G09F 13/12 (2013.01); F21W 2104/00 (2018.01); G02B 6/001 (2013.01); G02B 6/0021 (2013.01); G02B 6/0023 (2013.01);
(Continued)

(58) Field of Classification Search
CPC .......... B60R 13/005; F21W 2104/00
USPC ......................................... 362/459
See application file for complete search history.

(56) References Cited

U.S. PATENT DOCUMENTS

| 5,806,957 A | 9/1998 | Prior et al. |
| 7,387,397 B2 * | 6/2008 | Konet ............ B60R 13/00 362/603 |

(Continued)

FOREIGN PATENT DOCUMENTS

| DE | 102 30 023 A1 | 1/2004 |
| DE | 10 2004 029 248 A1 | 1/2006 |
(Continued)

OTHER PUBLICATIONS

German Search Report, Application No. DE 10 2017 217 508.7, dated Aug. 10, 2018, 10 pgs.

Primary Examiner — Matthew J. Peerce
(74) Attorney, Agent, or Firm — Paul D. Strain, Esq.; Strain & Strain PLLC

(57) ABSTRACT

The invention relates to an illuminable emblem, in particular for a motor vehicle, having a housing with a front cover which is at least regionally transparent on a front side, a rear-side housing base, which are connected to one another and enclose a cavity, wherein, in the cavity, there is arranged a light conductor which at least regionally forms webs, which directly adjoin transparent regions of the front cover, for the defined emergence of light from the web of the light conductor into the front cover and through the front cover, wherein the light conductor furthermore has at least one light coupling-in region at which there is arranged at least one illuminant for the coupling-in of light into the light conductor, wherein the light conductor, between the webs, forms free spaces which are filled by the front cover and/or by the housing base.

15 Claims, 5 Drawing Sheets

(51) Int. Cl.
*G09F 13/12* (2006.01)
*F21V 8/00* (2006.01)
*F21W 104/00* (2018.01)
*G09F 13/04* (2006.01)

(52) U.S. Cl.
CPC .......... *G02B 6/0045* (2013.01); *G02B 6/0065* (2013.01); *G09F 2013/044* (2013.01)

(56) References Cited

U.S. PATENT DOCUMENTS

| | | | |
|---|---|---|---|
| 8,210,564 B2* | 7/2012 | Helmstetter | B60R 13/02 |
| | | | 280/728.3 |
| 10,168,039 B2* | 1/2019 | Dellock | F21V 23/003 |
| 10,279,736 B2* | 5/2019 | Schneider | F21V 7/0091 |
| 2011/0247158 A1 | 10/2011 | Jungnickel et al. | |
| 2012/0280528 A1* | 11/2012 | Dellock | B60R 1/06 |
| | | | 296/1.08 |

FOREIGN PATENT DOCUMENTS

| | | |
|---|---|---|
| DE | 10 2008 061 853 A1 | 6/2010 |
| DE | 10 2015 220 341 A1 | 4/2017 |
| EP | 2 322 962 A1 | 5/2011 |

* cited by examiner

ILLUMINABLE EMBLEM

CROSS-REFERENCE TO RELATED PATENT APPLICATIONS

This application is based upon and claims the benefit of priority from prior German Patent Application No. 10 2017 217 508.7, filed Sep. 29, 2017, the entire contents of which are incorporated herein by reference in their entirety.

TECHNICAL FIELD

The invention relates to an illuminable emblem, in particular for a motor vehicle.

PRIOR ART

In motor vehicles, emblems in particular on the front end and on the rear end are known, which identify for example the vehicle manufacture or the vehicle type. Such emblems may for example also, as a flap closure element, actuate a lock, or serve as a radome and cover a radar sensor. Here, the known emblems are produced for example as metal plaques or plastic plaques, and are typically not visible or only poorly visible at night.

Recently, there has been interest in illuminating such emblems in order that they are clearly visible even in darkness.

DE 10 2015 220 341 A1 has disclosed an illuminable emblem as a radome for covering a radar sensor. Here, the areal light conductor to the front plate is covered by a plate which is impermeable to light, and the light is introduced in a lateral direction through a diffuser into the front plate and is reflected on an angled reflective surface, such that the light emerges from the front plate towards the front, and the emblem is made visible in illuminated form to the viewer. Here, it has been found that, owing to the areal form of the light conductor and owing to the light being laterally coupled out of the light conductor towards the front plate by means of the reflective surface of the front plate, increased manufacturing outlay is necessary, which also leads to increased costs.

Presentation of the Invention, Problem, Solution, Advantages

The problem addressed by the invention is that of providing an illuminable emblem which is simple and inexpensive to produce and which permits easy identifiability in darkness.

Said problem is solved by means of the features of Claim 1.

An exemplary embodiment of the invention relates to an illuminable emblem, in particular for a motor vehicle, having a housing with a front cover which is at least regionally transparent on a front side, a rear-side housing base, which are connected to one another and enclose a cavity, wherein, in the cavity, there is arranged a light conductor which at least regionally forms webs, which directly adjoin transparent regions of the front cover, for the defined emergence of light from the web of the light conductor into the front cover and through the front cover, wherein the light conductor furthermore has at least one light coupling-in region at which there is arranged at least one illuminant for the coupling-in of light into the light conductor, wherein the light conductor, between the webs, forms free spaces which are filled by the front cover and/or by the housing base. By means of the design of the webs of the light conductor, the light can be conducted in targeted and efficient fashion into the regions to be illuminated, without light being unnecessarily conducted into regions which are not visible in any case from the outside and under some circumstances being coupled out or scattered out of the light conductor there. Furthermore, by means of the webs of the light conductor, line-type illumination of the emblem is possible, which is optically very sharply and clearly discernible, because the webs extend to the transparent front cover. In order that the emblem is suitable for use as a radome, according to the invention, the intermediate spaces between the webs for radar beams are uniformly filled. Thus, in particular, a distortion of the radar beams owing to non-filled intermediate spaces between the webs can be minimized in relation to regions which are of non-transparent form or which are covered.

In one exemplary embodiment, it is expedient if the at least regionally transparent front cover has at least one transparent region and at least one non-transparent region. In this way, the emblem can be optically configured by virtue of the illuminated or luminous regions being defined through the geometrical selection of the transparent regions, which illuminated or luminous regions are delimited by non-transparent regions.

Here, the transparent region of the front cover is advantageously manufactured from a transparent plastic, which permits simple production and desired stability for example with respect to stone impacts etc.

In one exemplary embodiment, it is also advantageous if a non-transparent region of the front cover is formed by a non-transparent plastic. In this way, it is possible for the transparent region and the non-transparent region to be produced for example jointly or successively by injection molding. For example, it is possible for the transparent region to be molded first, in particular as a pane, and for the non-transparent region to subsequently be molded onto said transparent region. It is also possible for the non-transparent region to be molded first, and for the transparent region to be molded onto said non-transparent region.

In one exemplary embodiment, it is expedient if the non-transparent plastic is applied as a layer to the transparent region, in particular to the transparent plastic.

Alternatively or in addition, it may be advantageous if a non-transparent region of the front cover is formed by a non-transparent coating such as a lacquer, foil and/or metallization, which is applied in particular to the transparent region or to the transparent plastic. Here, a non-transparent coating of said type may be applied for example to the front side and from the rear side of the front cover.

It is accordingly also advantageous if a non-transparent coating is a multi-layer coating. For this purpose, it is possible for multiple layers to be applied one on top of the other. For example, a metallization may be applied to a lacquer, which metallization may also in turn be covered by a lacquer. Here, such lacquers may be applied for example by screenprinting etc. A metallization may be applied for example as an indium coating, which has characteristics suitable for radar beams.

It is also advantageous if the transparent region of the front cover at least regionally has a non-transparent coating on the side facing towards the light conductor. In this way, the luminous region is sharpened in terms of its optics and perception.

It is also advantageous if the non-transparent coating is cut out or removed adjacent to the webs of the light conductor, in particular by lasering. In this way, the region through which the light is intended to pass is cut out.

It is also advantageous if the housing base is formed from a non-transparent material such as plastic or metal or the like. This prevents light from being able to escape to the rear side, which improves the efficiency of the illumination.

Further advantageous refinements are described by the following figure description and by the subclaims.

BRIEF DESCRIPTION OF THE DRAWINGS

The invention will be discussed in more detail below on the basis of at least one exemplary embodiment and with reference to the drawings, in which.

PREFERRED EMBODIMENT OF THE INVENTION

FIGS. 1 to 5 show, in various illustrations, in each case one exemplary embodiment of an illuminable emblem 1 according to the invention or details thereof, which emblem may be used for example as a cover, as a flap closure element for a lock or as a radome for covering a radar sensor, in particular on the front or on the rear of a motor vehicle. An illuminable emblem of said type may also be used in other ways.

The illuminable emblem 1 has at least one illuminant which is activatable and deactivatable and/or also controllable in terms of its brightness and/or in terms of its color, such that the emblem is illuminable. Here, the emblem is illuminated in particular from an inner region, such that, viewed from the outside, in particular viewed from the front of the emblem, said emblem is self-illuminating when the at least one illuminant is activated.

Figure 1:
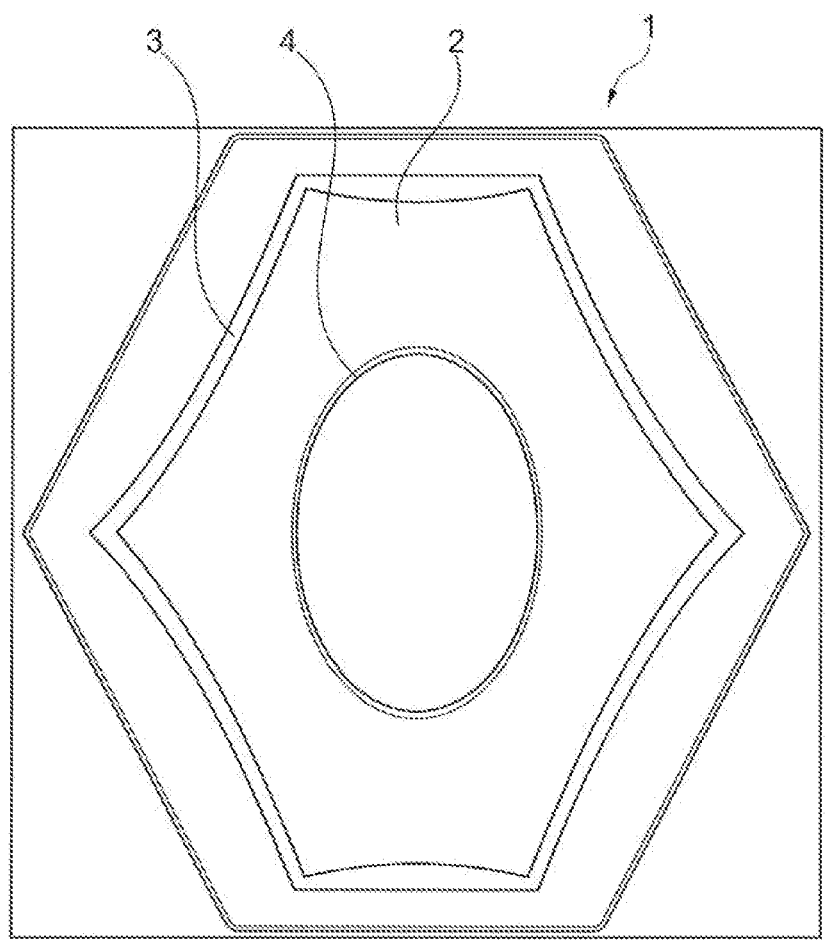
FIG. 1 shows a schematic sectional view of the emblem.

FIG. 1 shows a front view of an illuminable emblem 1, which exhibits substantially a rhomboidal figurative motif 2. Here, the rhomboidal motif 2 is delimited by two approximately hexagonal or tetragonal or oval closed lines 3, 4, which are illuminable, such that light emerges from the approximately hexagonal or tetragonal lines 3, 4 from the rear or from the interior.

Figure 2:
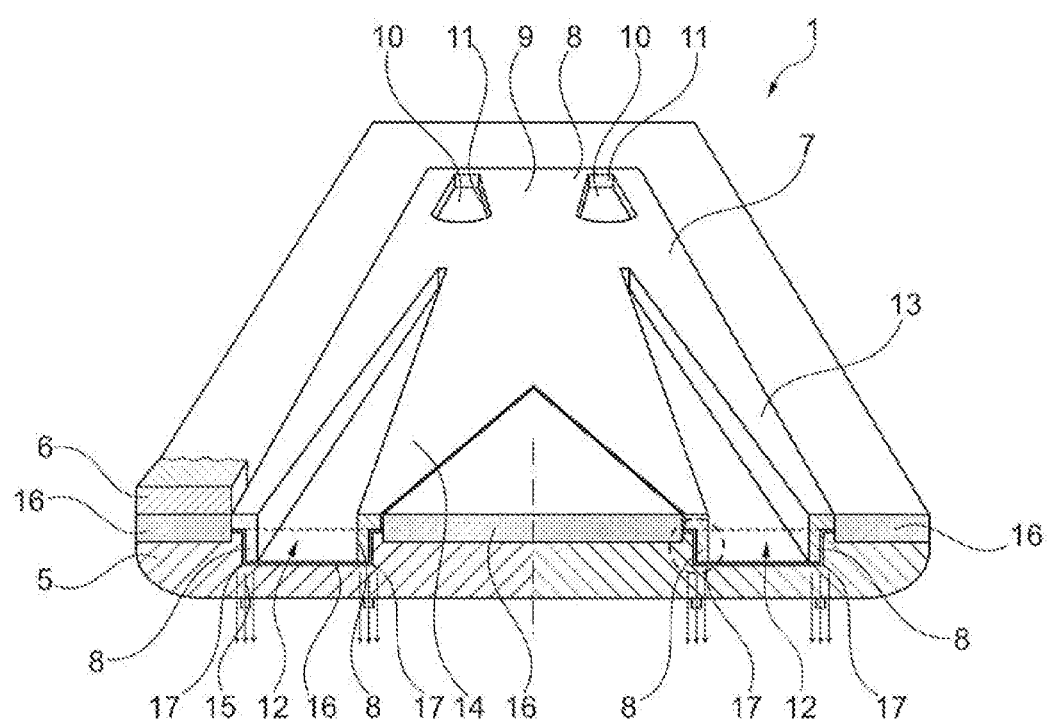
FIG. 2 shows a perspective partial illustration of an exemplary embodiment of an emblem.

FIG. 2 shows an exemplary embodiment of an emblem 1 in a perspective partial illustration. The illuminable emblem has a front-side, at least regionally transparent front cover 5 and a rear-side housing base 6, see also the housing base 6 of FIG. 4, which are connected to one another. The housing base 6 is merely indicated in FIG. 2. The front cover 5 and the housing base 6 are optionally connected to one another in sealed fashion and form a housing in order to enclose a cavity which, in the sealed exemplary embodiment, protects the elements arranged in the cavity from dirt and moisture. If this is not necessary, the arrangement may also be of non-sealed form. In this case, the front cover and the base would merely be formed so as to be connected to one another, for example directly or indirectly connected to one another.

In the cavity, there is arranged a light conductor 7 which at least regionally forms webs 8 which directly adjoin transparent regions of the front cover 5 and which serve for the targeted conducting of the light into the regions to be illuminated and for the defined emergence of light from the respective web 8 of the light conductor 7 into the front cover 5 and through the front cover 5.

The webs 8 are formed as part of the light conductor 7, which also has at least one areal region 9 for connecting the webs 8, wherein the light conductor 7 furthermore has at least one light coupling-in region 10 at which there is arranged at least one illuminant 11 for the coupling-in of light into the light conductor 7.

Here, the light conductor 7 with its webs 8 is designed such that, between the webs 8, there are formed free spaces 12 which are not filled by the light conductor 7 or by the material of the light conductor itself, but which are filled by the front cover 5 and/or by the housing base 6.

Here, the webs 8 are arranged so as to form the figurative design as shown by way of example in FIG. 1. Said webs form an outer, approximately hexagonal shape 13 and an inner, approximately tetragonal shape 14.

In the exemplary embodiment of FIG. 2, the at least regionally transparent front cover 5 has at least one transparent region 15 and at least one non-transparent region 16.

The transparent region 15 of the front cover 5 is preferably produced from a transparent plastic. The non-transparent region 16 or at least one transparent region 16 of the front cover 5 and is advantageously formed by a non-transparent plastic.

The non-transparent plastic may in this case be applied as a layer to the transparent region, in particular to the transparent plastic, see also the reference designation 16 in FIG. 2.

Alternatively or in addition, a non-transparent region 16 of the front cover 5 may be formed by a non-transparent coating, such as a lacquer, foil and/or metallization, in particular applied to the transparent region or to the transparent plastic.

In those regions 17 of the front cover 5 which the webs 8 of the light conductor 7 are situated directly opposite, the transparent front cover 5 does not have a non-transparent coating or the like, such that the light can emerge from the webs 8.

Figure 3:
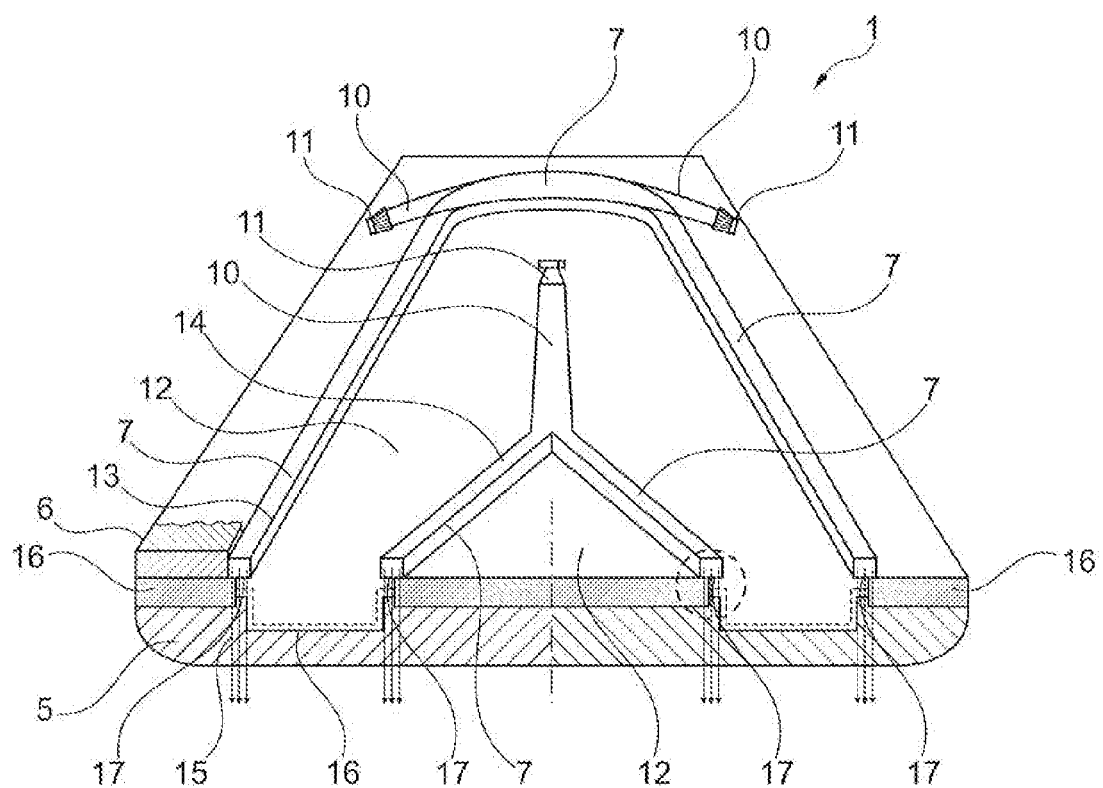
FIG. 3 shows a perspective partial illustration of a further exemplary embodiment of an emblem.

FIG. 3 shows a further exemplary embodiment of an emblem 1 in a perspective partial illustration. The illuminable emblem 1 has a front-side, at least regionally transparent front cover 5 and a rear-side housing base 6 which are connected to one another. The front cover 5 and the housing base 6 are optionally connected to one another in sealed fashion and form a housing in order to enclose a cavity which, in the sealed exemplary embodiment, protects the elements arranged in the cavity from dirt and moisture. If this is not necessary, the arrangement may also be of non-sealed form. In this case, the front cover and the base would merely be formed so as to be connected to one another, for example directly or indirectly connected to one another.

In the cavity, there is arranged a light conductor 7 which is of two-part form and which at least regionally forms webs 8 which directly adjoin transparent regions 17 of the front cover 5 and which serve for the defined emergence of light from the respective web 8 of the light conductor 7 into the front cover 5 and through the front cover 5.

The webs 8 are formed as part of the multi-part light conductor 7, wherein each light conductor part of the light conductor 7 has at least one light coupling-in region 10 at which there is arranged at least one illuminant 11 for the coupling-in of light into the respective web 8 of the light conductor 7.

Here, the multi-part light conductor 7 with its webs 8 is designed such that, between the webs 8, there are formed free spaces 12 which are not filled by the light conductor 7 or by the material of the light conductor itself, but which are filled by the front cover 5 and/or by the housing base 6.

Here, the webs 8 are arranged so as to form the figurative design as shown by way of example in FIG. 1. Said webs form an outer, approximately hexagonal shape 13 and an inner, approximately oval or tetragonal shape 14.

In the exemplary embodiment of FIG. 3, the at least regionally transparent front cover 5 has at least one transparent region 15 and at least one non-transparent region 16. The transparent region 15 of the front cover 5 is preferably produced from a transparent plastic. The non-transparent region 16 or at least one transparent region 16 of the front cover 5 is advantageously formed by a non-transparent plastic. The non-transparent plastic may in this case be applied as a layer to the transparent region, in particular to the transparent plastic. Alternatively or in addition, a non-transparent region 16 of the front cover 5 may be formed by a non-transparent coating, such as a lacquer, foil and/or metallization, in particular applied to the transparent region or to the transparent plastic.

Figure 4:
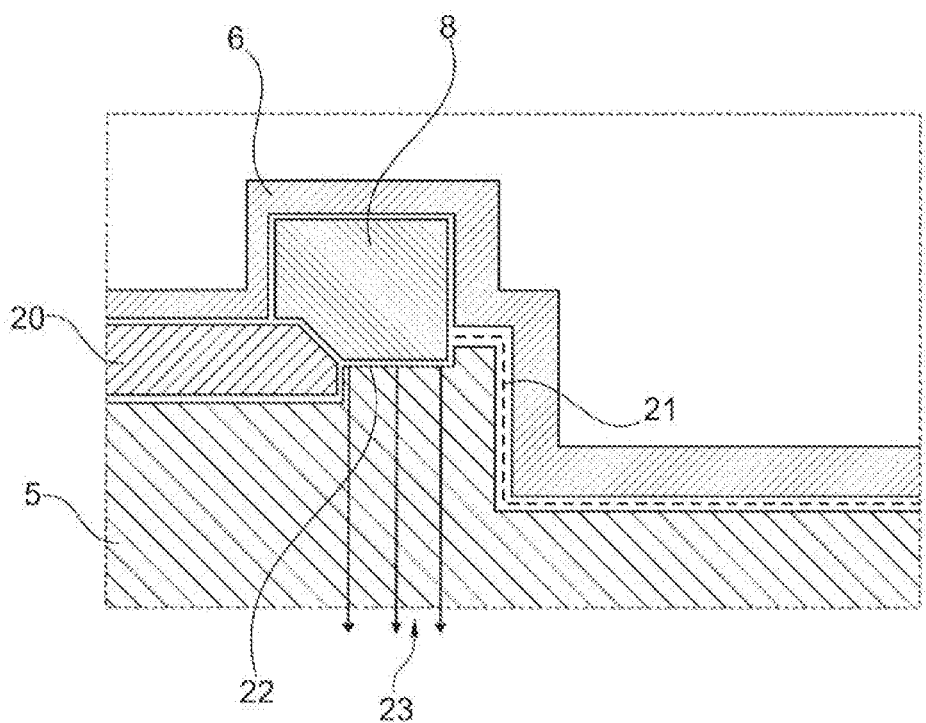
FIG. 4 shows a detail illustration of an emblem in section.

FIG. 4 shows an enlarged detail of an arrangement of a web 8 of a light conductor 7 which makes contact with a transparent region of a front cover 5. Here, a part of the transparent region of the front cover 5 is covered by a non-transparent material 20 or by a coating 21, for example a metallization, in non-transparent form. Only a rather narrow transparent region 22 is present, which is situated opposite the web 8. There, the light of the web 8 of the light conductor can enter the front cover and emerge from the front cover in a forward direction, see the arrows 23. Here, the web 8 lies partially on the transparent region of the front cover and partially on a non-transparent region of the front cover.

On the rear side, the front cover 5 and the web 8 are covered by a housing base 6.

The non-transparent coating 21 may be formed as a single-layer coating or as a multi-layer coating, such as for example a metallic coating composed for example of indium.

FIG. 4 shows that the transparent region of the front cover 5 has a non-transparent coating on the side facing towards the light conductor or towards the web 8.

Here, the non-transparent coating is formed on one side of the web 8 as a non-transparent plastics material 20 and on the other side as a metallic coating 21. Here, the non-transparent coating is cut out or removed, in particular by lasering, adjacent to the web 8 or to the webs 8 of the light conductor or of the light conductors.

The housing base 6 is formed from a non-transparent material, such as plastic or metal or the like.

Figure 5:
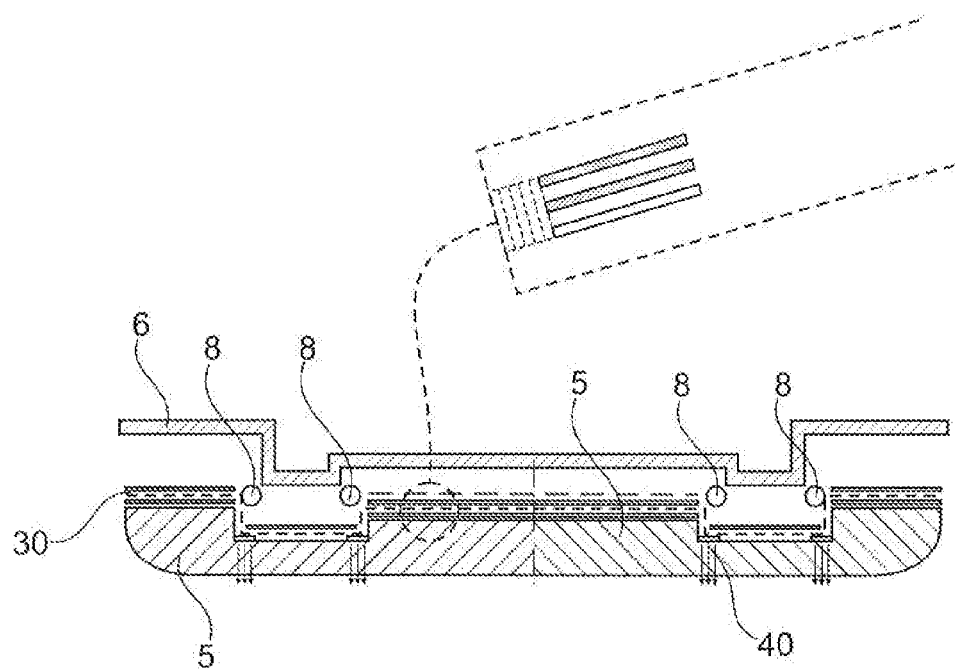
FIG. 5 shows a sectional illustration of a further exemplary embodiment of an emblem.

FIG. 5 shows a further exemplary embodiment, in which the transparent front cover 5 is provided, which is coated on the rear side. Here, the coating 30 is formed as a three-layer coating. The coating 30 is formed as a three-layer foil with an opaque layer on both sides with an indium layer in between. The opaque layers are applied by screenprinting and are for example of black form.

The passage of the light from the web 8 to the transparent front cover is realized by means of a lasering or other removal 40 of the coating 30. Onto the rear side of the coating there is placed a housing base 6, which also covers the light conductor with the webs 8.

LIST OF REFERENCE DESIGNATIONS

1 Emblem
2 Motif
3 Line
4 Line
5 Front cover
6 Housing base
7 Light conductor
8 Web
9 Areal region
10 Light coupling-in region
11 Illuminant
12 Free space
13 Outer, approximately hexagonal shape
14 Inner, approximately tetragonal shape
15 Transparent region
16 Non-transparent region
17 Transparent region of the front cover 5
20 Non-transparent material
21 Coating
22 Narrow transparent region
23 Arrow
30 Coating
40 Removal

The invention claimed is:

1. An illuminable emblem, for a motor vehicle, comprising:
   a front cover having a transparent region and a non-transparent region, wherein light transmission is prevented through the non-transparent region,
   a rear-side housing base, wherein the front cover and the rear-side base are connected to one another and enclose a cavity, and
   a light conductor arranged in in the cavity, wherein the light conductor comprises a plurality of webs which directly adjoins the transparent region of the front cover for the defined emergence of light from each web of the light conductor into the front cover and through the front cover,
   wherein the light conductor furthermore has a light coupling-in region at which there is arranged an illuminant for the coupling-in of light into the light conductor,
   wherein the light conductor, between the plurality of webs, forms free spaces which are filled by the front cover or by the housing base.

2. The illuminable emblem according to claim 1,
   wherein the at least regionally transparent front cover has a plurality of transparent regions and a plurality of non-transparent regions.

3. The illuminable emblem according to claim 1,
   wherein the transparent region of the front cover comprises a transparent plastic.

4. The illuminable emblem according to claim 1,
   wherein the non-transparent region of the front cover comprises a non-transparent plastic which prevents light transmission through the non-transparent region.

5. The illuminable emblem according to claim 4,
   wherein the non-transparent plastic comprises a layer of plastic applied to the transparent region.

6. The illuminable emblem according to claim 1,
   wherein the non-transparent region of the front cover comprises a non-transparent coating applied to the transparent region, wherein the non-transparent coating prevents light transmission through the non-transparent region.

7. The illuminable emblem according to claim 6, wherein the non-transparent coating is a multi-layer coating.

8. The illuminable emblem according to claim 1, wherein the front cover has a non-transparent coating on the side facing towards the light conductor.

9. The illuminable emblem according to claim 8, wherein the non-transparent coating is cut out or removed adjacent to the webs of the light conductor in the transparent region.

10. The illuminable emblem according to claim 1, wherein the housing base comprises a non-transparent material.

11. The illuminable emblem according to claim 6, wherein the non-transparent coating comprises a lacquer, foil, or metallization.

12. The illuminable emblem according to claim 9, wherein the non-transparent coating is cut out or removed by lasering.

13. The illuminable emblem according to claim 10, wherein the housing base comprises plastic or metal.

14. The illuminable emblem according to claim 7, wherein at least two layers of the multi-layer coating have different layer compositions.

15. The illuminable emblem according to claim 14, wherein a first layer of the at least two layers comprises a screen-printed material, wherein a second layer of the at least two layers comprises a metal.

\* \* \* \* \*